US012561994B2

(12) United States Patent
Liu et al.

(10) Patent No.: US 12,561,994 B2
(45) Date of Patent: Feb. 24, 2026

(54) SYSTEM FOR DETERMINING EVAPORATION ENDPOINT BY IMAGE RECOGNITION IN EVAPORATION AND CRYSTALLIZATION PROCESS OF AMMONIA-NITROGEN WASTEWATER

(71) Applicant: DONGJIANG ENVIRONMENTAL COMPANY LIMITED, Guangdong (CN)

(72) Inventors: Zhibin Liu, Guangdong (CN); Junqiang Zhu, Guangdong (CN); Zengmeng Yu, Guangdong (CN); Zongwen Zhao, Guangdong (CN); Wenbin Xu, Guangdong (CN)

(73) Assignee: DONGJIANG ENVIRONMENTAL COMPANY LIMITED, Shenzhen (CN)

( * ) Notice: Subject to any disclaimer, the term of this patent is extended or adjusted under 35 U.S.C. 154(b) by 64 days.

(21) Appl. No.: 18/567,680

(22) PCT Filed: Dec. 31, 2021

(86) PCT No.: PCT/CN2021/143707
§ 371 (c)(1),
(2) Date: Dec. 6, 2023

(87) PCT Pub. No.: WO2023/123365
PCT Pub. Date: Jul. 6, 2023

(65) Prior Publication Data
US 2024/0282128 A1      Aug. 22, 2024

(51) Int. Cl.
G06K 9/00 (2022.01)
G01N 21/84 (2006.01)
G06V 20/69 (2022.01)

(52) U.S. Cl.
CPC ........... G06V 20/698 (2022.01); G01N 21/84 (2013.01); G06V 20/693 (2022.01); G01N 2021/8477 (2013.01)

(58) Field of Classification Search
None
See application file for complete search history.

(56) References Cited

U.S. PATENT DOCUMENTS

2008/0006034 A1*  1/2008  Cerroni ..................... B09B 3/35
                                                              95/55
2019/0062188 A1*  2/2019  Yin ........................... C02F 9/00

FOREIGN PATENT DOCUMENTS

CN          207645992 U      7/2018
CN          208603749 U      3/2019
(Continued)

OTHER PUBLICATIONS

International Search Report of PCT/CN2021/143707.
Written Opinion of PCT/CN2021/143707.

*Primary Examiner* — SJ Park

(57) ABSTRACT

The present disclosure relates to the technical field of resource utilization of ammonia-nitrogen wastewater and in particular to a system for determining an evaporation endpoint by image recognition in an evaporation and crystallization process of an ammonia-nitrogen wastewater. The key points of the technical scheme are as follows: the system includes an evaporator, a sampling platform, a data transmission module, and an image recognition system; the sampling platform is disposed below an evaporation interface of the evaporator to collect crystals dropping from the evaporation interface and collect image information of the crystals; the data transmission module is configured to transmit data of the sampling platform to the image recognition system; the image recognition system is configured to process the image information of the crystals obtained by the (Continued)

Figure 1:
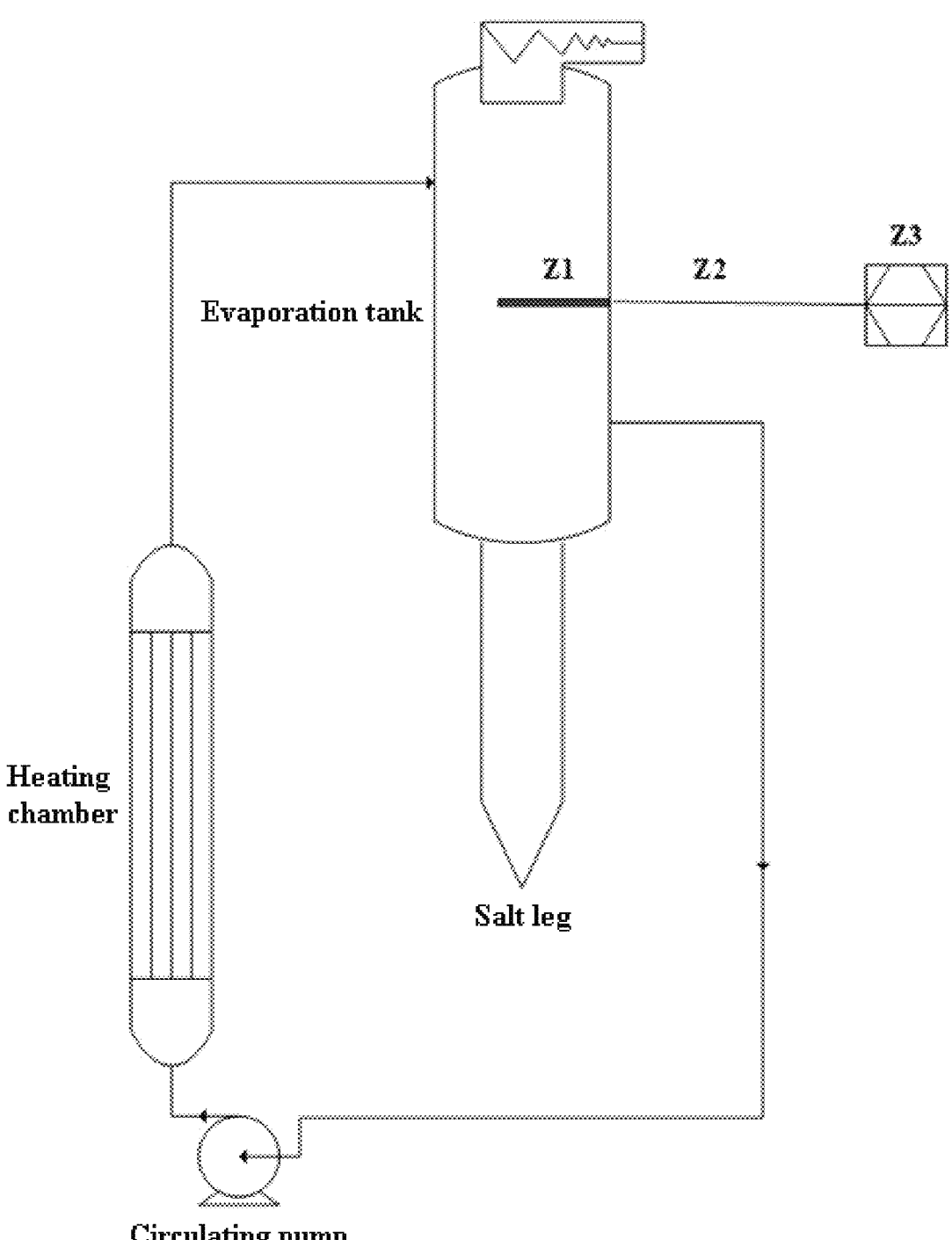

sampling platform and determine an evaporation and crystallization endpoint.

4 Claims, 3 Drawing Sheets

(56)                    References Cited

FOREIGN PATENT DOCUMENTS

| CN | 112231909 A | 1/2021 |
| CN | 113307436 A | 8/2021 |
| CN | 113772738 A | 12/2021 |

* cited by examiner

SYSTEM FOR DETERMINING EVAPORATION ENDPOINT BY IMAGE RECOGNITION IN EVAPORATION AND CRYSTALLIZATION PROCESS OF AMMONIA-NITROGEN WASTEWATER

CROSS-REFERENCE TO RELATED APPLICATION

This Application is a national stage application of PCT/ CN2021/143707. This application claims priority from PCT Application No. PCT/CN2021/143707, filed Dec. 13, 2021, the content of which is incorporated herein in the entirety by reference.

TECHNICAL FIELD

The present disclosure relates to the technical field of resource utilization of ammonia-nitrogen wastewater and in particular to a system for determining an evaporation endpoint by image recognition in an evaporation and crystallization process of ammonia-nitrogen wastewater.

BACKGROUND

At present, resource utilization of ammonium-nitrogen wastewater is achieved by salt separation crystallization. Further, salt separation crystallization can be performed on sodium chloride-ammonium chloride wastewater to produce sodium chloride and ammonium chloride. However, the key to salt separation crystallization is to determine an evaporation endpoint so as to maximize the separation of sodium chloride and ammonium chloride.

Nowadays, in industrial production, the evaporation endpoint is usually determined by monitoring a liquid level through a camera or by using a liquid level and a solid-liquid ratio. Both of the methods are indirect control methods. However, the control approach is not accurate enough to accurately separate sodium chloride from ammonium chloride, leading to sodium chloride including ammonium chloride, or ammonium chloride including sodium chloride. Hence, the product fails to meet the corresponding standard.

SUMMARY

In order to address the shortcomings of the prior arts, the present disclosure provides a system for determining an evaporation endpoint by image recognition in an evaporation and crystallization process of an ammonium-nitrogen wastewater, which has the advantages of accurately controlling the evaporation endpoint in an evaporation and crystallization process of the ammonium-nitrogen wastewater.

The technical object of the present disclosure is achieved by employing the following technical scheme: there is provided a system for determining an evaporation endpoint by image recognition in an evaporation and crystallization process of an ammonium-nitrogen wastewater, which includes an evaporator, a sampling platform, a data transmission module, and an image recognition system;

the sampling platform is disposed below an evaporation interface of the evaporator to collect crystals dropping from the evaporation interface and collect image information of the crystals;

the data transmission module is configured to transmit data from the sampling platform to the image recognition system;

the image recognition system is configured to process the image information of the crystals obtained by the sampling platform and determine an evaporation and crystallization endpoint.

In one example, an industrial microscope is disposed on the sampling platform to collect crystals.

In one example, a sweeping mechanism is disposed on the sampling platform to remove the crystals on the industrial microscope.

In one example, the image recognition system includes a crystal database including G1 sodium chloride crystal pictures and G2 ammonium chloride crystal pictures.

The above system for determining an evaporation endpoint by image recognition in an evaporation and crystallization process of ammonia-nitrogen wastewater has the following beneficial effects:

In the present disclosure, the evaporation and crystallization endpoint can be accurately and directly determined to separate out sodium chloride as possible and thus fully separate sodium chloride from ammonium chloride, thereby improving the product quality, increasing the production efficiency, and reducing the energy consumption.

BRIEF DESCRIPTIONS OF THE DRAWINGS

Figure 2:
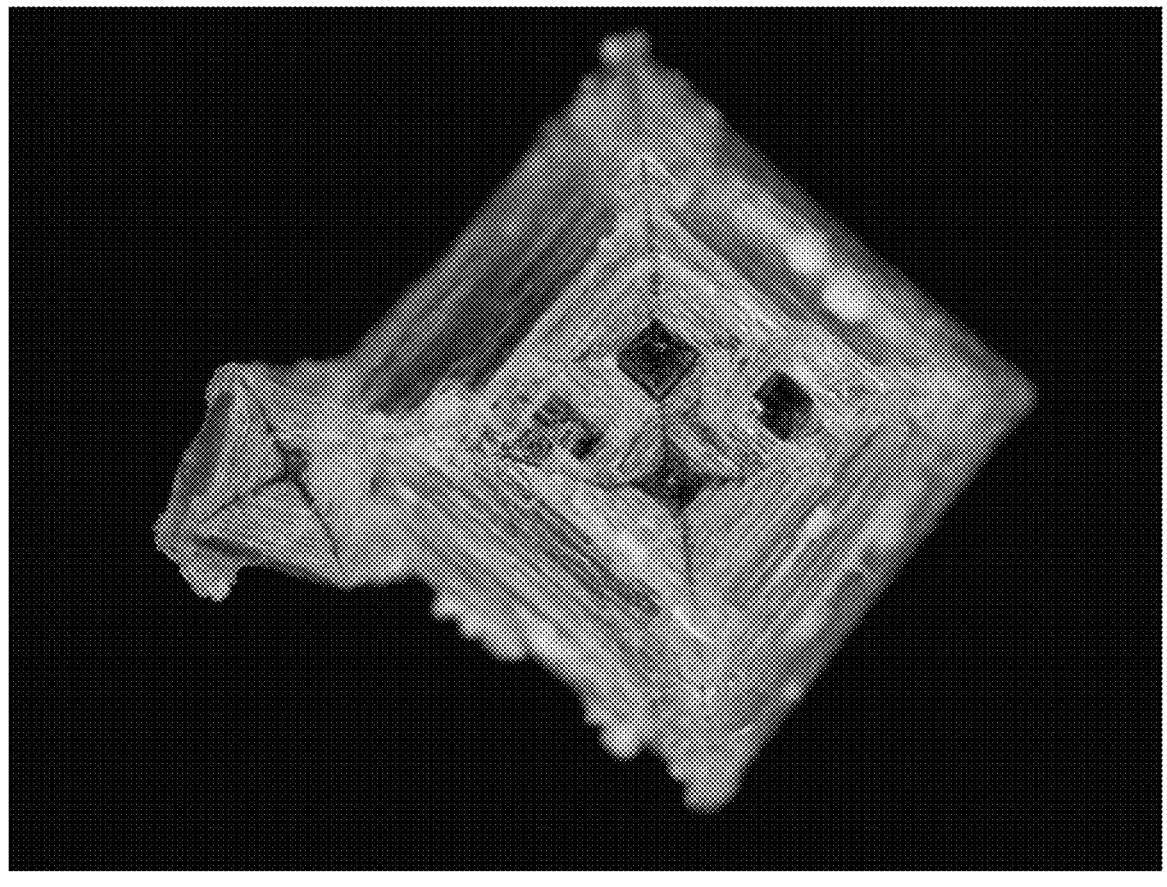
Figure 3:
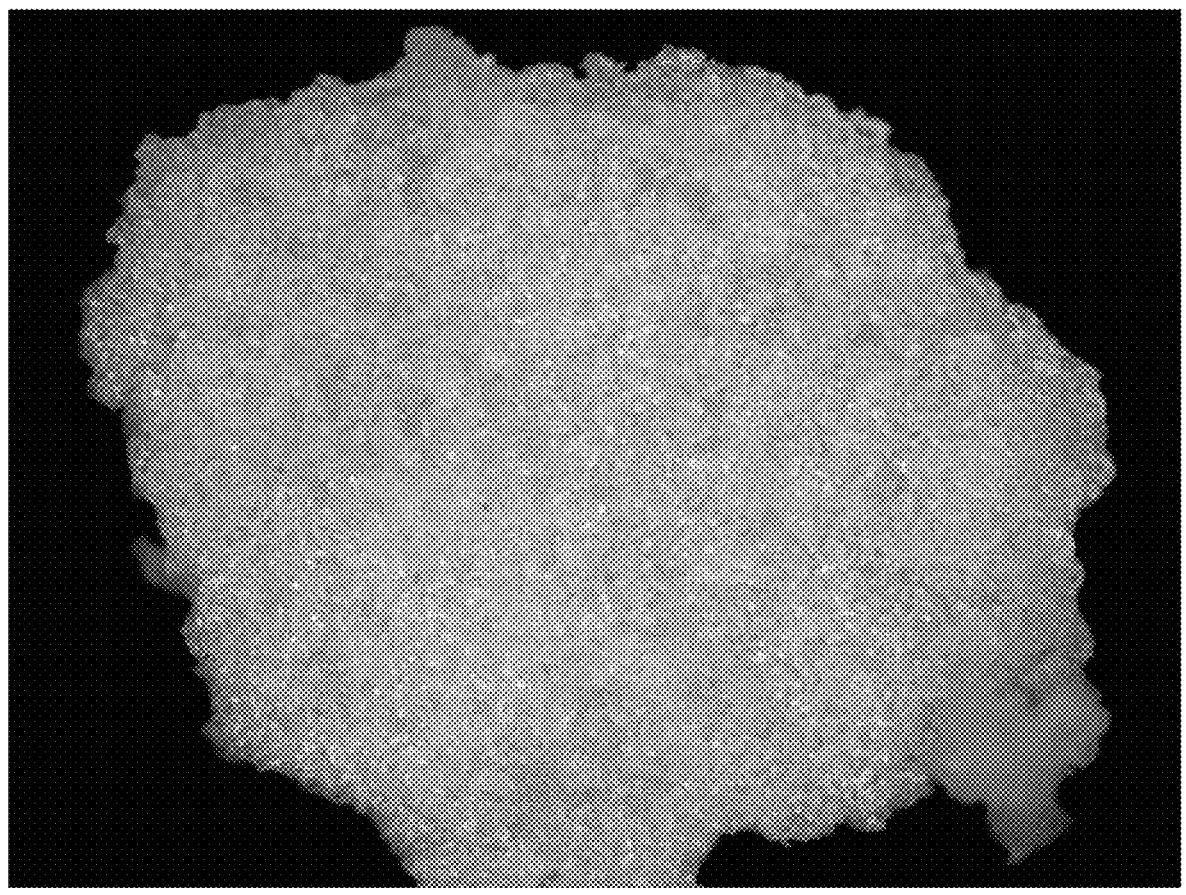

FIG. 1 is a flowchart of an example.
FIG. 2 illustrates sodium chloride crystals in an example.
FIG. 3 illustrates ammonium chloride crystals in an example.

DETAILED DESCRIPTIONS OF EMBODIMENTS

The present disclosure will be detailed below in combination with drawings and specific examples.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and does not indicate or imply that the indicated devices or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present disclosure, "several" refers to at least two, for example, two or three or the like, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

There is provided a system for determining an evaporation endpoint by image recognition in an evaporation and crystallization process of an ammonia-nitrogen wastewater, including an evaporator, a sampling platform, a data transmission module, and an image recognition system.

The sampling platform is disposed below an evaporation interface of the evaporator to collect crystals dropping from the evaporation interface and collect image information of the crystals.

Furthermore, an industrial microscope is disposed on the sampling platform to collect crystals.

Furthermore, a sweeping mechanism is disposed on the sampling platform to remove the crystals on the industrial microscope.

The data transmission module is configured to transmit data from the sampling platform to the image recognition system.

The image recognition system is configured to process the image information of the crystals obtained by the sampling platform and determine an evaporation and crystallization endpoint.

Furthermore, the image recognition system includes a crystal database including G1 sodium chloride crystal pictures and G2 ammonium chloride crystal pictures. The image recognition system compares the image information with the crystal database to determine a type of the crystals and hence the evaporation and crystallization endpoint.

Preferably, the image recognition system can be updated continuously, and for different crystal information, different mapping relationships are established to continuously perfect the image recognition system.

Specific examples are illustrated below.

Example 1

The ammonia-nitrogen wastewater in the example refers to a sodium chloride-ammonium chloride system, which may contain a small amount of impurities such as sulfate nitrate and the like. As shown in FIG. 1, the ammonia-nitrogen wastewater runs through a circulating pump into a heating chamber for heating and then enters an evaporation tank for evaporation and crystallization to separate out crystals. A sampling platform Z1 is disposed between a salt leg and the evaporation interface to collect crystals separated out by the evaporation interface through high-temperature crystallization. The industrial microscope records the image information of the crystals and transmits it to the image recognition system Z3 through the data transmission module Z2. In the image recognition system Z3, the crystal images are compared with the database containing G1 and G2. If the result is G1, the evaporation is continued; if the result is G1+G2, the evaporation is stopped.

Sodium chloride entering the salt leg is centrifuged to produce sodium chloride, and the ammonium chloride saturated liquid is subjected to cooling crystallization and centrifugation separation to produce ammonium chloride.

The above examples are only illustrative and used to interpret some features of the method of the present disclosure. The appended claims are intended to claim a scope conceived of as widely as possible, and the examples mentioned in the present disclosure are those in which true test results of the applicant are demonstrated. Therefore, the applicant desires that the appended claims are not limited by the selection of the examples describing the features of the present disclosure. Some numerical ranges used in the claims also include sub-ranges within them and the changes of these ranges shall also be, in possible cases, interpreted as covered by the appended claims.

What is claimed is:

1. A system for determining an evaporation endpoint by image recognition in an evaporation and crystallization process of an ammonia-nitrogen wastewater, comprising an evaporator, a sampling platform, a data transmission module, and an image recognition system; wherein, the sampling platform is disposed below an evaporation interface of the evaporator to collect crystals dropping from the evaporation interface and collect image information of the crystals;

the data transmission module is configured to transmit data from the sampling platform to the image recognition system;

the image recognition system is configured to process the image information of the crystals obtained by the sampling platform and determine an evaporation and crystallization endpoint.

2. The system of claim 1, wherein, an industrial microscope is disposed on the sampling platform to collect crystals.

3. The system of claim 2, wherein, a sweeping mechanism is disposed on the sampling platform to remove the crystals on the industrial microscope.

4. The system of claim 1, wherein the image recognition system comprises a crystal database comprising G1 sodium chloride crystal pictures and G2 ammonium chloride crystal pictures.

* * * * *